Figure 1:
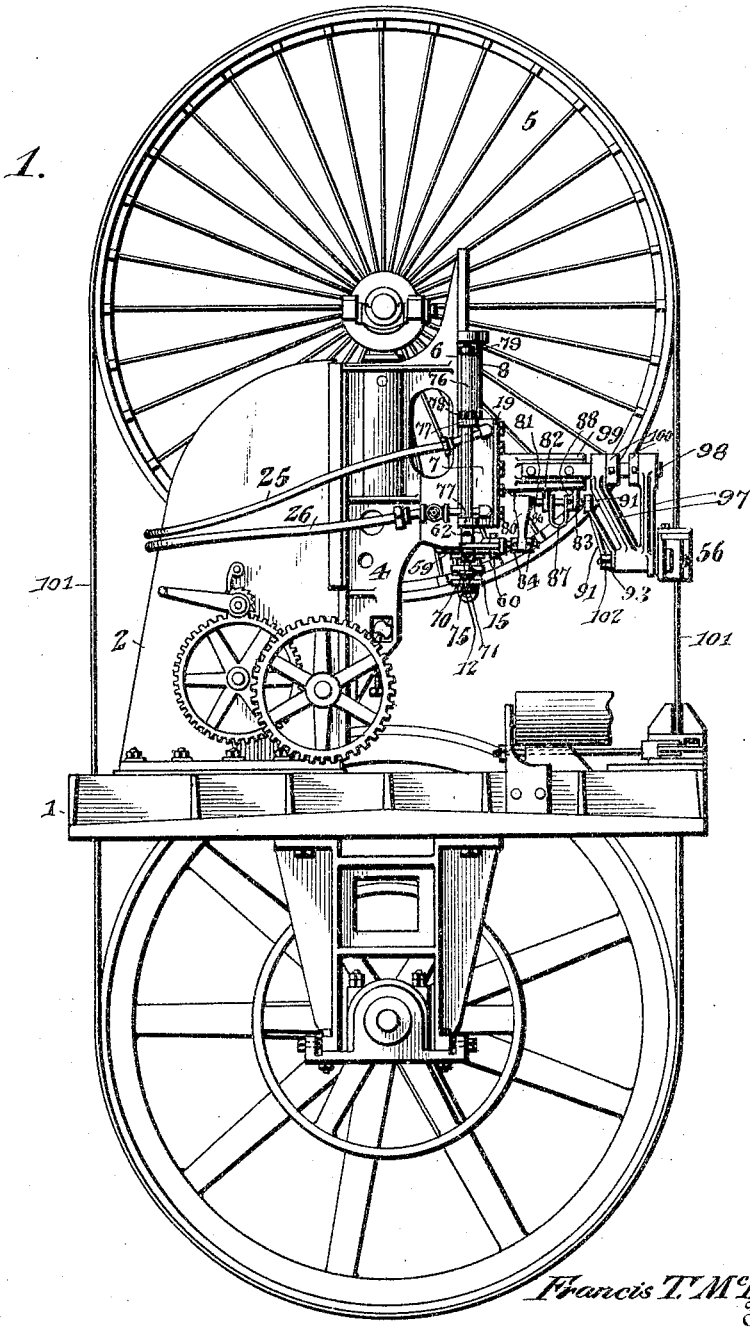

No. 778,991. PATENTED JAN. 3, 1905.
F. T. McDONOUGH.
BAND SAW GUIDE.
APPLICATION FILED JAN. 20, 1904.

6 SHEETS—SHEET 1.

Witnesses
Jas. F. McCathran
W. F. Riley

Francis T. McDonough
Inventor

By E. G. Siggers
Attorney

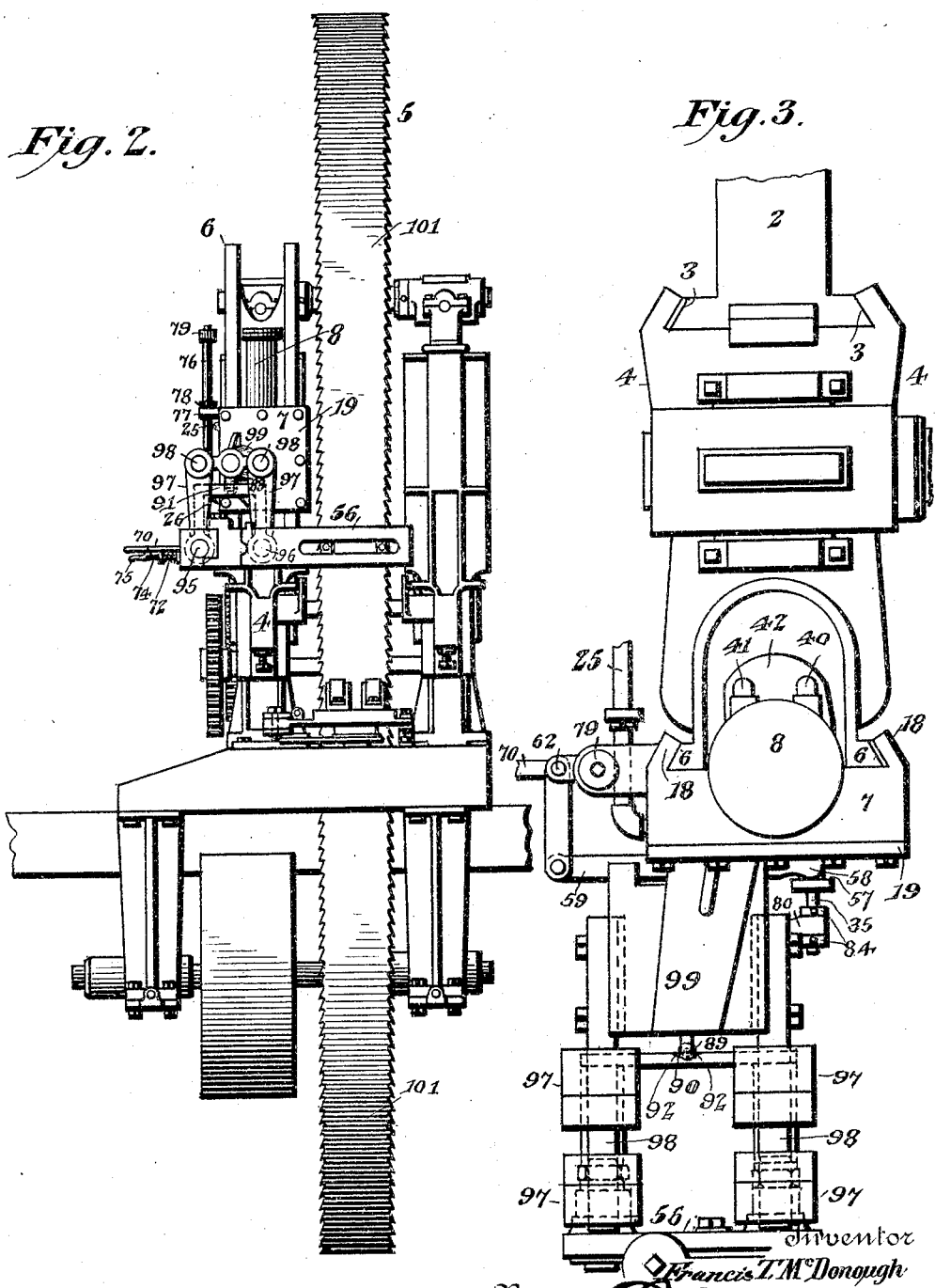

No. 778,991. PATENTED JAN. 3, 1905.
F. T. McDONOUGH.
BAND SAW GUIDE.
APPLICATION FILED JAN. 20, 1904.

6 SHEETS—SHEET 3.

Francis T. McDonough Inventor

Witnesses

By

Attorney

No. 778,991. PATENTED JAN. 3, 1905.
F. T. McDONOUGH.
BAND SAW GUIDE.
APPLICATION FILED JAN. 20, 1904.
6 SHEETS—SHEET 4.
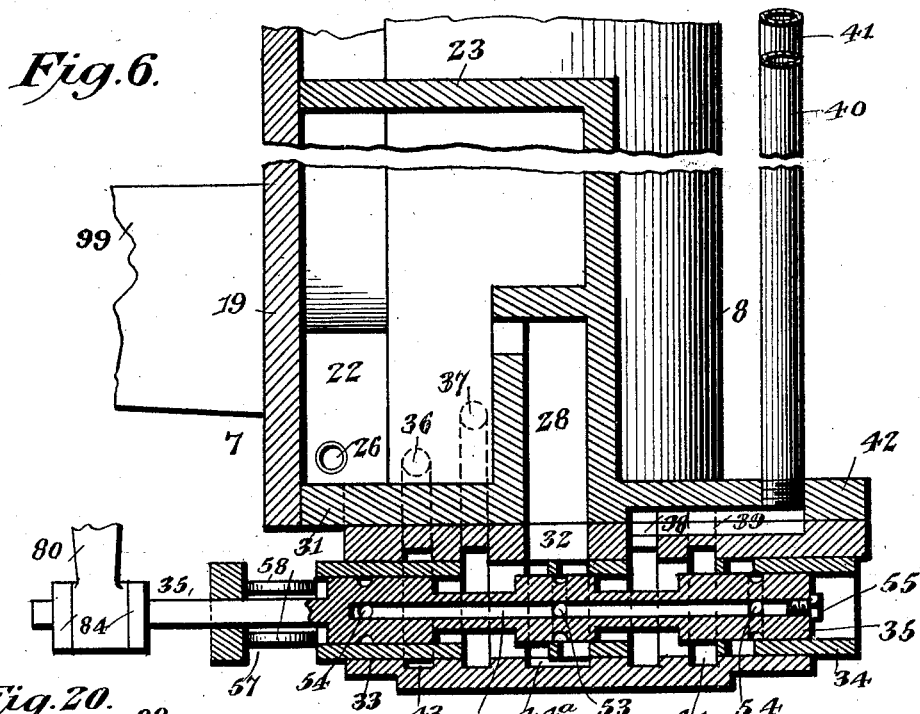
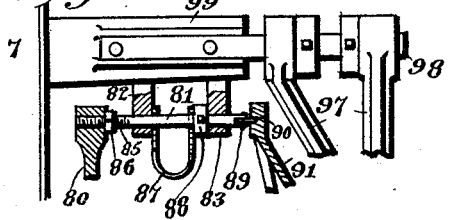
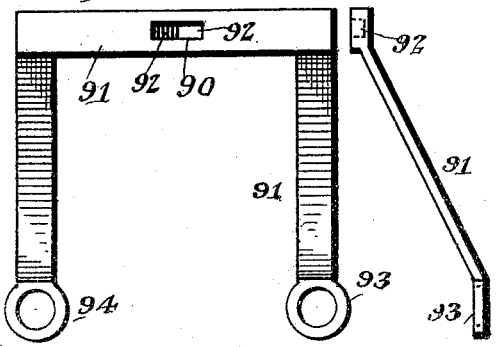
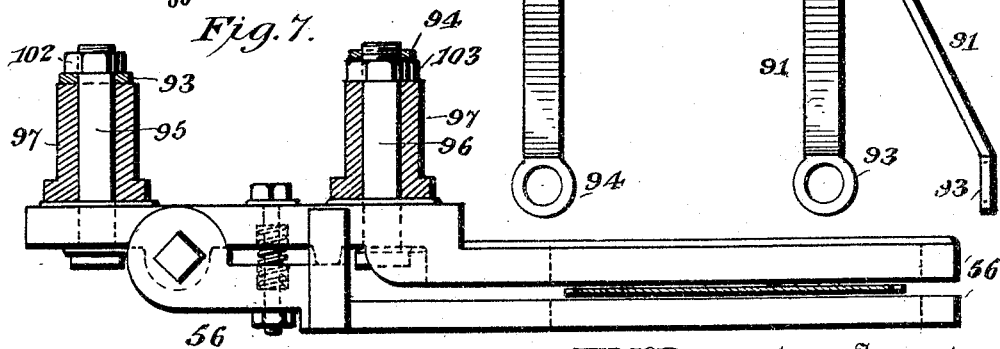
Witnesses
Jas. K. McCathran
H. F. Riley
Francis T. McDonough  Inventor
By E. G. Siggers  Attorney No. 778,991. PATENTED JAN. 3, 1905.
F. T. McDONOUGH.
BAND SAW GUIDE.
APPLICATION FILED JAN. 20, 1904.

6 SHEETS—SHEET 5.

Witnesses
Jas. K. McCathran
H. F. Riley

Francis T. McDonough, Inventor
By C. G. Siggers, Attorney

No. 778,991. PATENTED JAN. 3, 1905.
F. T. McDONOUGH.
BAND SAW GUIDE.
APPLICATION FILED JAN. 20, 1904.
6 SHEETS—SHEET 6.
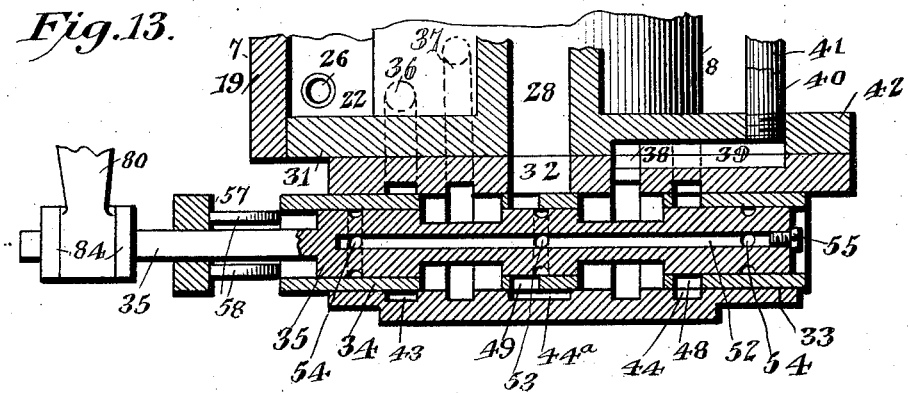
Fig. 13.
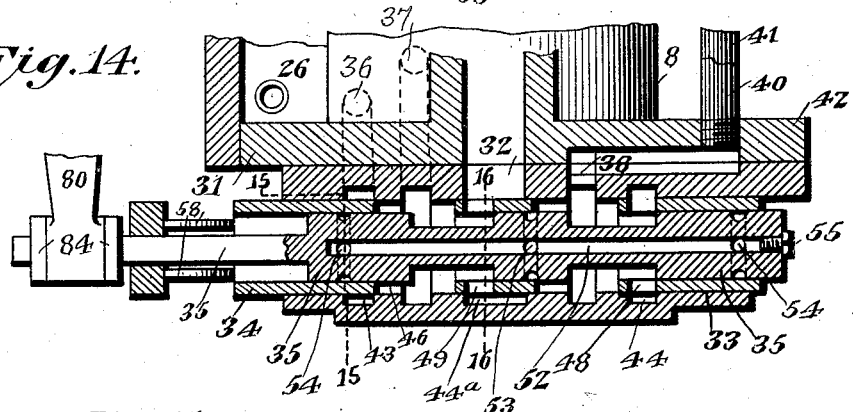
Fig. 14.
Fig. 15.
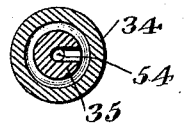
Fig. 17.
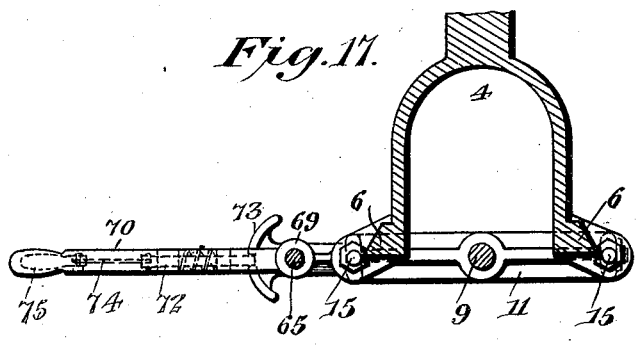
Fig. 16.
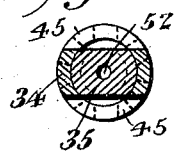
Francis T. McDonough, Inventor
Witnesses
Jas. H. McCathran
H. T. Riley
By E. G. Siggers
Attorney No. 778,991. Patented January 3, 1905.

UNITED STATES PATENT OFFICE.

FRANCIS THOMAS McDONOUGH, OF EAU CLAIRE, WISCONSIN.

BAND-SAW GUIDE.

SPECIFICATION forming part of Letters Patent No. 778,991, dated January 3, 1905.

Application filed January 20, 1904. Serial No. 189,831.

*To all whom it may concern:*

Be it known that I, FRANCIS THOMAS McDONOUGH, a citizen of the United States, residing at Eau Claire, in the county of Eau Claire and State of Wisconsin, have invented a new and useful Band-Saw Guide, of which the following is a specification.

The invention relates to improvements in band-saw-guide-operating mechanism.

The object of the present invention is to improve the construction of band-saw-guide-operating mechanism and to provide simple and comparatively inexpensive means for enabling a band-saw guide to be operated by hand for arranging it at the desired elevation and operated automatically, whereby when the saw-guide is struck by a log it will be raised clear of the same to tend to avoid breaking or otherwise injuring the saw-guide.

A further object of the invention is to provide operating mechanism of this character which will automatically raise the saw-guide when the same is struck either at the front or back by a log.

Another object of the invention is to enable both the controlling or sawyer's operating-valve and the emergency-valve to be carried by the vertically-movable slide with which the saw-guide is connected and to cause the controlling or operating valve to lubricate the emergency-valve, whereby the latter will be prevented from sticking in its seat and will be always in perfect condition for instant operation.

The invention also has for its object to provide saw-guide-operating mechanism which will permit the saw-guide to be arranged entirely out of the way when it is desired to saw a large log or piece of material with which the saw-guide in its normal position might interfere.

Moreover, the invention has for its object to enable the emergency-valve to be operated and the band-saw guide raised by the direct force of a log striking the guide, whereby the movement of the emergency-valve will be rendered more positive.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction may be resorted to without departing from the spirit or sacrificing any of the advantages of the invention.

Figure 4:
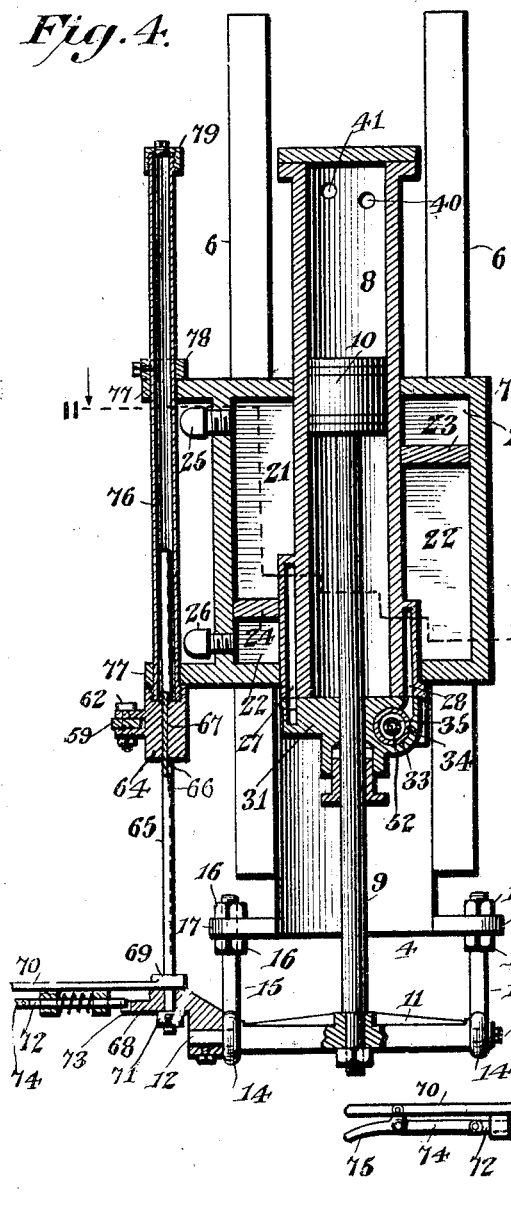
Figure 5:
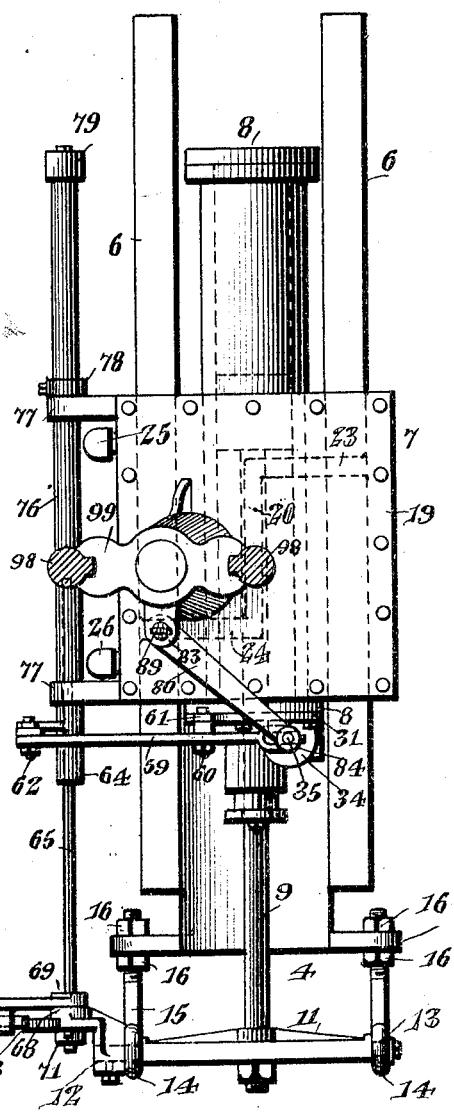
Figure 10:
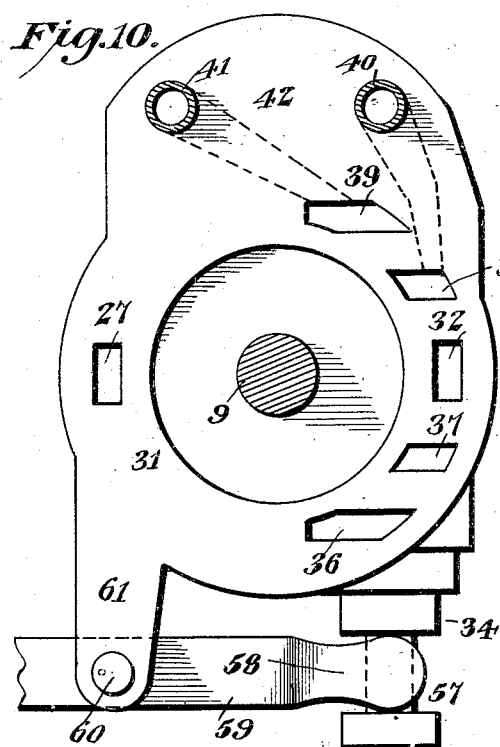
Figure 11:
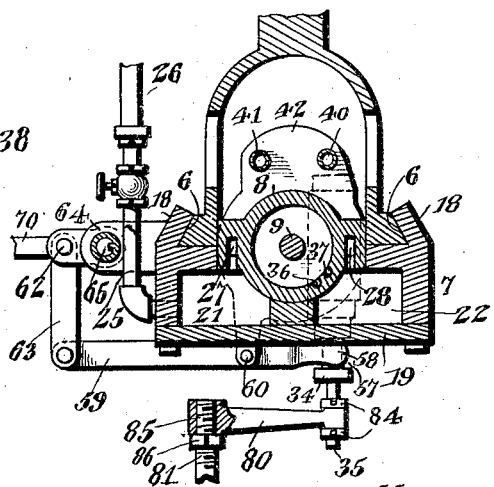
Figures 18, 19:
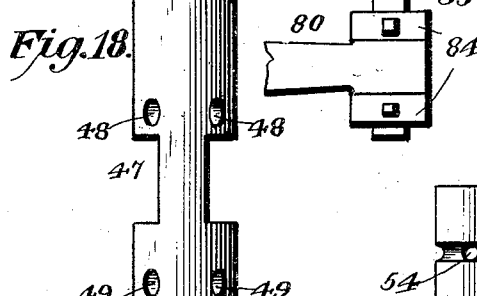
Figure 12:
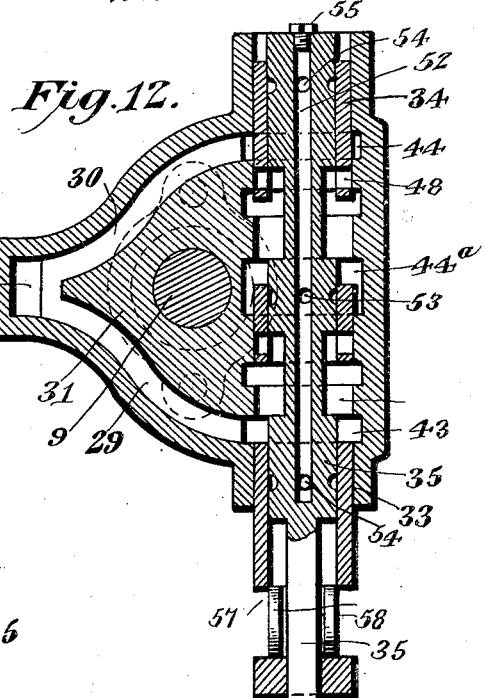

In the drawings, Figure 1 is a front elevation of a band-saw mill provided with saw-guide-operating mechanism constructed in accordance with this invention. Fig. 2 is a side elevation of the same. Fig. 3 is an enlarged detail plan view of the saw-guide-operating mechanism. Fig. 4 is an enlarged detail vertical sectional view illustrating the construction of the cylinder and the means for operating the same by hand. Fig. 5 is an elevation of the same. Fig. 6 is an enlarged detail vertical sectional view illustrating the construction of the valves. Fig. 7 is a detail view of the band-saw guide. Figs. 8 and 9 are detail views of the emergency-valve-operating device. Fig. 10 is an enlarged detail view of the bottom of the cylinder, illustrating the arrangement of the ports leading to the valve. Fig. 11 is a horizontal sectional view taken substantially on the line 11 11 of Fig. 4. Fig. 12 is a horizontal sectional view of the valve-casing and the valves. Fig. 13 is a vertical sectional view of the same, showing the emergency-valve in its normal position and the sawyer's operating and controlling valve in its intermediate position. Fig. 14 is a similar view illustrating the arrangement of the parts when the emergency-valve is operated. Fig. 15 is a transverse sectional view of the valves, taken substantially on the line 15 15 of Fig. 14. Fig. 16 is a similar view taken substantially on the line 16 16 of Fig. 14. Fig. 17 is a detail view illustrating the construction of the hand operating mechanism. Fig. 18 is a detail view of the sawyer's operating or controlling valve. Fig. 19 is a similar view of the emergency-valve. Fig. 20 is a detail view illustrating the manner of mounting the spring-actuated rod or plunger.

Similar reference-numerals indicate corresponding parts in all the figures of the drawings.

1 designates the base of the band-saw mill, upon which base are mounted columns 2, and the latter are provided with vertically-disposed dovetailed ways 3 for the reception of vertically-movable supports 4. These supports carry the upper band-saw wheel 5 and are vertically adjustable to arrange said band-saw wheel 5 to accommodate band-saws of different lengths. One of the supports 4 is provided with a pair of vertically-disposed dovetailed ways 6, adapted to receive a slide 7, consisting of a combined steam-chest, steam-cylinder, and saddle, all cast in one piece; but the parts may be constructed in any other desired manner, as will be readily understood, and although for convenience the cylinder and chest have been designated a "steam-chest" and a "steam-cylinder," yet it is contemplated to use compressed air or any other fluid or aeriform fluid under pressure for operating the motor.

The motor is formed by the cylinder 8, which is movable, and a piston 9, which is fixed with relation to the vertically-moving cylinder. The piston 9, which is provided at its upper end with a piston-head 10, has its lower end reduced, threaded, and secured to a cross-head 11, which is provided with a central aperture for the reception of the reduced end of the piston. The ends 12 and 13 of the cross-head are rounded to form journals or trunnions and are arranged in bearing-eyes 14 of depending straps or hangers 15, which are adjustably secured at their upper ends to the support 4 by nuts 16. The support 4 is provided with projecting horizontal lugs 17, which are pierced by the upper ends of the straps or hangers 15, the nuts 16 being arranged above and below the lugs. The cross-head is journaled in the bearing-eyes of the straps or hangers to permit the piston and the cylinder to yield to any inequalities in the dovetailed ways and to conform to the saw without binding against the same. The slide 7 is provided with inwardly-converging flanges 18 to fit the dovetailed ways 6, as clearly illustrated in Fig. 3 of the drawings. Between the dovetailed ways 6 the support is hollowed out or recessed to provide a vertical space for the reception of the inner portion of the cylinder and the pipes which are connected with the same.

The steam-chest, which is approximately rectangular in elevation, has a removable face-plate 19, which is bolted or otherwise secured to the body portion of the steam-chest. The said steam-chest is divided by a partition or wall 20 into a live-steam compartment or chamber 21 and an exhaust compartment or chamber 22, the said partition consisting of a central vertical front portion and oppositely-disposed horizontal top and bottom portions 23 and 24. Each of the chambers or compartments 21 and 22 is substantially L-shaped, and the live-steam compartment or chamber is adapted to receive a flexible steam pipe or hose 25, which is sufficiently slack to permit the necessary vertical movement of the slide 7. The other compartment or chamber, 22, is adapted to receive a flexible exhaust pipe or hose 26, which is also movable with the slide 7. These flexible pipes 25 and 26 are provided with suitable metallic couplings for engaging the threaded apertures of the steam-chest, as clearly illustrated in Figs. 1 and 4 of the drawings.

The steam-cylinder is provided at diametrically opposite points with upright passages 27 and 28, communicating, respectively, at their upper portions with the steam chamber or compartment and the exhaust chamber or compartment, as clearly indicated in Fig. 4 of the drawings. The lower end of the upright passage 27 communicates with a pair of horizontal steam-passages 29 and 30, formed in the valve-casing, which constitutes the bottom 31 of the cylinder, and extending to the opposite sides of the cylinder and adapted to admit steam either to the top or bottom of the cylinder, as hereinafter explained. The other upright passage, 28, communicates with a central exhaust-port 32 and is adapted to permit the exhaust from either end of the cylinder to enter the said compartment or chamber 22 and escape through the exhaust pipe or tube 26. The bottom 31 of the cylinder is bored at 33 to receive a sawyer's operating or controlling valve 34 and an emergency-valve 35, and it has ports 36 and 37 at its front portion. These ports 36 and 37 communicate directly with the lower portion of the cylinder at different elevations, for a purpose hereinafter explained. The end port 36 is adapted to be placed in communication with the steam-passage 29 at that side of the cylinder, and when steam is admitted to the bottom of the cylinder it passes through both of the ports 36 and 37 after the head of the piston has passed beyond and has uncovered the inner end of the port 37. When steam is admitted to the top of the cylinder, the port 36 is closed, and the port 37 then constitutes an exhaust-port and is placed in communication with the central exhaust-passage 28. The rear or inner portion of the bottom of the cylinder is provided with ports 38 and 39, which are connected with the top of the cylinder by pipes 40 and 41, which pierce the upper portion of the cylinder at different elevations, as indicated in Fig. 4 of the accompanying drawings.

The steam-inlet ports or passages 38 and 41 communicate with the cylinder a short distance from the ends thereof, whereby a cushion will be formed at each end of the said cylinder. The pipes or tubes 40 and 41, which extend to the top of the cylinder, are arranged exteriorly of the same, as shown, and are mounted on an extension 42 of the bottom of the cylinder, the extension being provided with passages extending from the passages 38 and 39, as indicated in dotted lines in Fig. 10 of the drawings.

The sawyer's controlling or operating valve 34 is cylindrical, as clearly shown in Figs. 15 and 16 of the drawings, and it fits snugly within the bore of the bottom of the cylinder and snugly receives the emergency-valve, which is rounded or cylindrical, and during the operation of the band-saw mill the controlling or sawyer's operating-valve is moved back and forth over the emergency-valve, whereby the latter is lubricated frequently and is effectively prevented from sticking in its seat. This is an exceedingly advantageous arrangement, as the emergency-valve, which, at the most, is but rarely operated, is maintained as free as the sawyer's operating-valve, which is frequently operated. The valve-receiving portion of the bottom of the cylinder is provided at the adjacent ends of the passages 29 and 30 with annular grooves 43 and 44, and an intermediate annular groove 44$^a$ is provided at the exhaust-port 32. The sawyer's operating-valve is provided with central and end recesses or openings 45, 46, and 47 for establishing communication between steam inlet and exhaust ports and the top and bottom of the cylinder. The said sawyer's operating-valve is also provided with perforations 48 and 49, forming inlet and exhaust ports when the emergency-valve is operated, as hereinafter explained. The emergency-valve is provided with recesses or apertures 50 and 51, adapted to form feed and exhaust ports, as hereinafter explained. When the sawyer's operating-valve is in its intermediate position, as illustrated in Fig. 13 of the drawings, both the steam inlet and exhaust ports, which lead to the top and bottom of the cylinder, are closed by said sawyer's operating or controlling valve and the emergency perforations or openings 48 and 49 are closed by the emergency-valve.

The emergency-valve is provided with a longitudinal bore 52, and it has intermediate and end perforations 53 and 54 communicating with the bore and extending radially therefrom. The bore and the perforations form drain-passages and dispense with the necessity of employing stuffing-boxes. The intermediate perforations 53 of the emergency-valve are in communication with the annular groove 44 at the exhaust-port 32 to conduct any leakage of steam to the said exhaust-port 32. The rear end of the bore or passage 52 is closed by a threaded plug 55, and the outer or end perforations 54 are covered by the sawyer's operating-valve when the latter is in its intermediate position. The emergency-valve is also annularly grooved at the center and end to connect the radial perforations 53 and 54. It will thus be seen that when the emergency-valve is in its normal position and the sawyer's operating-valve is in its intermediate position the steam inlet and exhaust ports of the cylinder are closed. Should the emergency-valve be operated and moved inward from the position illustrated in Fig. 13 to that shown in Fig. 14, the recesses or ports will establish a communication between the steam-inlet ports leading to the top of the cylinder and to the exhaust-port of the bottom of the cylinder. This is accomplished by the recesses or ports 50 being carried into communication with the emergency apertures or openings 48, which when the sawyer's operating-valve is in its intermediate position are in communication with the annular groove 43 and adjacent steam-inlet passage. The emergency-valve in its normal position closes or covers the emergency perforations or openings 48, as shown in Fig. 13. The other ports or recesses, 51, are carried by this inward or rearward movement of the emergency-valve into communication with the emergency exhaust perforations or openings 49. Steam is thus admitted to the top of the cylinder and exhausted at the bottom, thereby quickly raising the cylinder to elevate the saw-guide 56. As soon as the band-saw guide 56 is raised sufficiently to clear the log or other material the emergency-valve is automatically returned to its normal position by the means hereinafter explained.

When the sawyer's operating-valve is moved outward by the means hereinafter described to the position shown in Fig. 12, steam is admitted from the passage 29 through the bottom ports or passages 36 and 37 to the bottom portion of the cylinder, and the steam-inlet passage 30 at the opposite side of the cylinder is closed and the exhaust port or passage 32 is placed in communication with the exhaust-pipe 40, which extends to the top of the cylinder. The steam is thus admitted to the bottom of the cylinder and exhausted at the top to permit the slide to move downward to lower the guide. When the sawyer's operating or controlling valve is moved inward from the intermediate position illustrated in Fig. 13 to that shown in Fig. 6 of the drawings, the steam-inlet passage 29 is closed and the other steam-inlet passage, 30, is placed in communication with the ports or passages leading to the top of the cylinder. This movement also shuts off communication between the exhaust-port 32 and that leading to the top of the cylinder and establishes a communication between said exhaust-port 32 and that leading to the bottom of the cylinder. This causes the cylinder to move upward for raising the band-saw guide 56.

The sawyer's operating-valve has its outer end grooved at 57 to receive the forked or bifurcated end 58 of a horizontal lever 59, which is fulcrumed between its ends at 60 on an arm 61 of the bottom of the cylinder, and the other end of the lever is connected by a link 63 with an arm of a sleeve 64. The sleeve receives a shaft or rod 65, and its arm, which is bifurcated to receive the link, is pivoted to the latter by a pin 62.

The shaft or rod 65 is disposed vertically, being provided with a feather groove or way 66 for the reception of a feather-key 67 of the sleeve 64, whereby when the shaft or rod is rotated the arm of the sleeve will be oscillated to operate the lever 59. When the lever 59 is operated, the sawyer's operating or controlling valve is reciprocated.

The lower end of the shaft or rod is arranged in an opening of an approximately L-shaped piece or casting 68, consisting of horizontal and vertical portions, the horizontal portion being pierced by the lower end of the rod or shaft and the vertical portion being provided with an opening to receive the journal or trunnion 12 of the cross-head 11. The journal or trunnion 12 is extended, as shown in Fig. 4 of the drawings, and the casting or piece 68 is secured on the rod or shaft between the hub portions 69 of the operating-lever 70 and a collar 71. Said collar 71 is provided with a clamping-screw, and the hub or eye of the operating-lever may be fixed to the rod in any desired manner. The operating-lever is adapted to be oscillated to partially rotate the rod or shaft 65, and it is locked in its intermediate position by a spring-actuated dog or pawl 72, guided in perforated lugs of the lever and adapted to engage a recess of a groove or segmental portion 73 of the L-shaped piece or casting 68. The spring-actuated pawl or dog, which may be mounted in any desired manner, is connected by a link 74 with a latch-lever 75, located adjacent to the grip or handle portion of the operating-lever 70 and adapted to be grasped simultaneously with the same.

The upper portion of the rod or shaft 65 is housed within a tube 76, mounted in perforated lugs 77 and secured to the same by the sleeve 64 and by a collar 78. The upper end of the tube or casing 76 is closed by a cap 79, which is provided with an oil-hole, whereby the grooved rod or shaft 65 and the coöperating parts may be readily lubricated. The grooved rod or shaft and the sleeve 64 form a slidable connection between the operating-lever 70 and the sawyer's operating-valve 59 and are adapted to permit the operating mechanism to accommodate itself to the vertical movement of the cylinder. The emergency-valve is connected at its outer end with an arm 80 of a reciprocating rod or plunger 81, which is arranged in perforations of lugs 82 and 83. The arm 80 is provided at its lower end with a perforation to receive the outer end of the emergency valve or plug, and it is adjustably connected with the same by a pair of collars 84, arranged on the outer end of the emergency-valve at the inner and outer edges of the arm 80 and provided with set-screws for securing the collars in their adjustment.

By this construction the emergency-valve may be properly positioned with relation to the means for operating it. The upper end of the arm 80 is provided with a threaded opening 85 for the reception of the adjacent end of the rod or plunger 81, which is threaded, as shown, and which also carries a clamping-nut 86 for engaging the arm 80.

The rod or plunger 81, which is positively moved inward, as hereinafter explained, to operate the emergency-valve, is automatically returned to its normal position by a substantially V-shaped spring 87, having one end bearing against the lug 82 and its other end engaging an adjustable collar 88. The collar 88 is mounted on the rod or plunger and is adjustably secured to the same by a set-screw and is adapted to vary the tension of the spring. The sides of the spring 87 are provided with eyes or openings to receive the rod or plunger 81. The other end of the rod or plunger is provided with an antifriction-roller 89 to form an antifriction-bearing or engaging portion for the spring-actuated rod or plunger. The roller is normally arranged within a recess 90 of an emergency-valve-operating device 91, consisting of a substantially inverted-U-shaped frame. The recess 90, which has oppositely-disposed inclined portions 92, is formed in the upper connecting portion of the U-shaped frame, and these inclined portions are adapted to actuate the spring-actuated rod or plunger and move the same inward when the frame 91 is actuated, as hereinafter explained. The frame 91 is provided at the lower ends of its sides with eyes 93 and 94, which are arranged on bolts or pivots 95 and 96 of the band-saw guide 56. The pivots 95 and 96 connect the band-saw guide to a pair of links or hangers 97, which are composed of inner and outer sides or portions that depend from the horizontal rods 98. The horizontal rods 98 are bolted to an arm 99 of the slide and receive the links or hangers at their outer portions. The links or hangers are provided with top and bottom eyes for the reception of the rods 98 and the pivots 95 and 96, adjustable collars 100 being mounted on the horizontal rods 98 and interposed between the sides of the links or hangers, as clearly shown in Fig. 1. The links or hangers are adapted to be adjusted on the horizontal rods to position the saw-guide properly with relation to the band-saw 101.

When the saw-guide is struck by a log, it is moved horizontally and is raised vertically by means of the links or hangers. A horizontal movement of the saw-guide in either direction will operate the emergency-valve, and only a slight movement of the saw-guide is necessary to carry the angularly-disposed portions of the U-shaped frame or piece 91 into engagement with the spring-actuated rod or plunger. The emergency-valve is positively operated by the direct force of a log striking the saw-guide, which is quickly elevated by the motor, and as soon as it clears the log it will drop back to its normal position with relation to the band-saw and permit the spring-actuated plunger or rod to return the emergency-valve to its normal position.

The eye 93 of one side of the U-shaped emergency-valve-operating frame is secured to the bolt or pin 95 by the nut 102 thereof, and the other eye, 94, of the U-shaped frame is arranged on the pivot bolt or pin 96 beyond the nut 103 thereof and is adapted to be readily sprung therefrom, whereby the U-shaped frame is pivotally mounted at one side and detachably interlocked at the opposite side to permit it to be swung around out of the way when it is desired to utilize the entire space between the base of the band-saw mill and the upper wheel for cutting a log of extra large diameter. After the U-shaped frame is swung out of position the guide-hangers are held back by hand or other suitable means a sufficient distance to permit the band-saw guide to clear the rim of the wheel. The guide is then raised to the limit of its movement, thereby clearing the entire space between the upper wheel and the base of the band-saw mill.

Having thus described my invention, what I claim as new, and desire to secure by Letters Patent, is—

1. The combination of a horizontal saw-guide, a support for the same, and means for automatically raising the support and the guide when the latter is moved from its normal position, said guide being horizontally movable in either direction and automatically returning to its normal position with relation to the saw after elevation, substantially as described.

2. The combination of a guide movable horizontally in either direction, a support for the same, and means for automatically raising the support when the guide is moved horizontally in either direction from its normal position, substantially as described.

3. The combination of a support, a band-saw guide movable horizontally in either direction and adapted to return automatically to its normal position with relation to a saw, means for automatically raising the support when the guide is moved horizontally in either direction from its normal position and for stopping the support when the guide has returned to its normal position with relation to the saw, substantially as described.

4. The combination of a guide movable horizontally in either direction, a motor for raising the guide, and means for automatically operating the motor when the guide is moved horizontally in either direction from its normal position, substantially as described.

5. The combination with a support, a motor connected with the support for raising and lowering the same, a horizontally-movable guide carried by the support, operating mechanism independent of the guide and automatically movable in one direction for operating the motor, and means carried by the guide for moving said operating mechanism in the opposite direction, substantially as described.

6. The combination with a support, a motor connected with the support for raising and lowering the same, a horizontally-movable guide, operating mechanism independent of the guide and connected with the motor and arranged to be positively actuated by the guide for raising the support, and means for automatically moving the operating mechanism in the opposite direction to stop the support, substantially as described.

7. The combination of a support, a motor connected with the support for raising and lowering the same, a horizontally-movable guide carried by the support, an actuating-frame movable with the guide, operating mechanism connected with the motor and arranged to be positively actuated by the frame for raising the support when the guide is moved horizontally, and means independent of the guide for automatically moving the operating mechanism in the opposite direction to stop the support, substantially as described.

8. The combination of a support, a motor connected with the support for raising and lowering the same, hangers pivotally connected with the support, a horizontally-movable guide carried by the hangers, an approximately U-shaped frame connected with the hangers and movable with the guide, operating mechanism connected with the motor and arranged to be positively actuated by the frame when the guide is moved horizontally, and means for automatically moving the operating mechanism in the opposite direction, substantially as described.

9. The combination of a support, a motor for raising and lowering the same, a pair of pivotally-mounted hangers carried by the support, a horizontally-movable guide pivotally connected with the hangers, operating mechanism connected with the motor, and an actuating-frame mounted on one of the pivots of the guide and detachably connected with the other pivot of the guide and adapted to be sprung out of engagement with the same to permit the hangers and the guide to be swung away from the saw, substantially as described.

10. The combination of a support, a movable guide carried by the same, a motor connected with the support for raising and lowering the same, a hand-operated valve carried by the support for controlling the motor, and an emergency-valve also carried by the support and operable by the guide, one of said valves being located within the other, substantially as described.

11. The combination of a support, a guide carried by the same, a motor for raising and lowering the support, a hand-operated valve mounted on the support for controlling the motor, and an emergency-valve located within the hand-operated valve and operable by the guide, said hand-operated valve being movable over the emergency-valve, whereby the latter is prevented from sticking, substantially as described.

12. The combination of a support, a motor for raising and lowering the same, a movable guide, a tubular reciprocating hand-operated valve for controlling the motor, and a reciprocatory emergency-valve fitting within the hand-operated valve and operable by the guide, substantially as described.

13. The combination of a motor having a cylinder, a chest provided with feed and exhaust compartments, feed and exhaust passages communicating with the compartments, a tubular hand-operated valve, and a guide-operated emergency valve or plug arranged within the hand-operated valve, substantially as described.

14. The combination with a vertically-movable slide, of a motor embodying a cylinder provided with feed and exhaust passages, the feed-passage being provided with opposite branches, passages arranged in pairs and communicating with the ends of the cylinder, a tubular hand-operated valve having central and end ports and provided with emergency-ports, an emergency-valve operating within the tubular valve, and a saw-guide carried by the slide and adapted to operate the emergency-valve, substantially as described.

15. The combination of a vertically-movable guide, and a motor for operating the same embodying a cylinder having feed and exhaust passages, the feed-passages having opposite branches, passages arranged in pairs and communicating with the ends of the cylinder, a tubular hand-operated valve having intermediate and end ports and provided with emergency-ports, and an emergency-valve having ports and operating within the tubular valve and controlled by the guide, said emergency-valve being also provided with a bore and having perforations communicating therewith for conducting any leakage to the exhaust-passage, substantially as described.

16. The combination of a guide, a motor for raising and lowering the same, said motor embodying a vertically-movable cylinder and a fixed piston, a valve for controlling the motor and movable with the cylinder, a tube carried by the cylinder, a shaft telescoping in the tube, manually-operated operating mechanism connected with the shaft, and means movable with the cylinder and slidably interlocked with the shaft for communicating motion therefrom to the valve, substantially as described.

17. The combination of a guide, a motor for raising and lowering the same embodying a vertically-movable cylinder, a fixed piston, and a valve, a shaft provided with manually-operated operating mechanism, a sleeve slidably interlocked with the shaft and movable with the cylinder, and means for communicating motion from the sleeve to the valve, substantially as described.

18. The combination of a guide, a motor for raising and lowering the guide embodying a vertically-movable cylinder and a fixed piston, a valve, a lever movable with the cylinder and connected with the valve, a sleeve having an arm connected with the lever, and a shaft provided with manually-operated operating mechanism and slidably interlocked with the sleeve, substantially as described.

19. The combination of a guide, a motor for raising and lowering the guide embodying a vertically-movable cylinder and a relatively fixed piston, a cross-head receiving the piston and provided with trunnions, supports having bearings for the trunnions, a bracket or piece mounted on one of the trunnions, a vertical shaft journaled on the bracket or piece, a sleeve slidably interlocked with the shaft, a valve, and means for communicating motion from the sleeve to the valve, substantially as described.

In testimony that I claim the foregoing as my own I have hereto affixed my signature in the presence of two witnesses.

FRANCIS THOMAS McDONOUGH.

Witnesses:
B. HOGAN,
JAS. W. HUBBARD.